United States Patent Office 3,580,935
Patented May 25, 1971

3,580,935
PROCESS FOR THE PREPARATION OF 3-ENOL ETHERS OF 3-KETO-Δ⁴ - 6-(N-DISUBSTITUTED) AMINOMETHYL STEROIDS
Verlan H. VanRheenen, Kalamazoo, Mich., assignor to The Upjohn Company, Kalamazoo, Mich.
No Drawing. Filed Nov. 19, 1969, Ser. No. 878,247
Int. Cl. C07c *169/00*
U.S. Cl. 260—397.1                              7 Claims

ABSTRACT OF THE DISCLOSURE

This invention relates to a novel and general process for the conversion of the 3-enol ethers of 3-keto-Δ⁴-steroids, unsubstituted at the 4 and 6 positions, of the androstane, 19-norandrostane, pregnane, 19-norpregnane and spirostane series (1), into the corresponding 6-(N-disubstituted)aminomethyl derivatives (III). The compounds III have anabolic, androgenic, anti-fertility, anti-inflammatory and estrogenic activities, and are consequently useful in treating mammals, including humans, birds and other animals in those conditions and/or ailments where such activities are desired. The compounds of Formula III are additionally useful as intermediates in the preparation, by known methods, of the physiologically active and therapeutically useful 6-methyl steroids, such as medroxyprogesterone acetate ($\alpha$-methyl-17$\alpha$-hydroxy-4-pregnene-3,20-dione 17-acetate), dimethisterone [6$\alpha$-methyl-17$\beta$-hydroxy-17$\alpha$-(1 - propynyl)-4-androsten-3-one], methylprednisolone (6$\alpha$-methyl-11$\beta$,17$\alpha$,21-trihydroxy-1,4-pregnadiene-3,20-dione), fluoromethylone (6$\alpha$-methyl-9$\alpha$-fluoro-11$\beta$,17$\alpha$-dihydroxy-1,4-pregnadiene-3,20-dione), etc.

BRIEF SUMMARY OF THE INVENTION

The present invention provides a process for the preparation of 3-enol ethers of 3-keto-Δ⁴-6-(N-disubstituted)-aminomethyl steroids of the androstane, 19-norandrostane, pregnane, 19-norpregnane and spirostane series having in rings A and B of the steroids nucleus the structure:

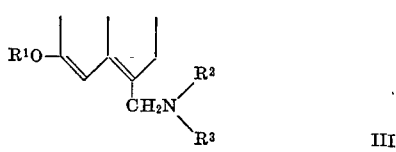

III wherein $R^1$ is selected from the group consisting of alkyl of from one through twelve carbon atoms, hydroxyalkyl of from one through twelve carbon atoms, cycloalkyl of from three through eight carbon atoms, aryl of from six through fourteen carbon atoms, alkaryl wherein the aryl moiety is from six through fourteen carbon atoms and alkyl group(s) substituted therein contain(s) from one through twelve carbon atoms, aralkyl wherein the alkyl moiety is from one through twelve carbon atoms, and the aryl group(s) substituted therein contain(s) from six through fourteen carbon atoms, and $R^2$ and $R^3$ are independently selected from the group consisting of methyl, tertiary alkyl, aryl and alkaryl which are as defined above, which process comprises mixing a corresponding compound of the formula:

II wherein $R^2$ and $R^3$ have the same meaning as above and $$\overset{\ominus}{X}$$

is the conjugate base of a strong acid with a corresponding steroid compound having in rings A and B of the steroid nucleus the structure:

I wherein $R^1$ has the same meaning as above.

Androstane series is defined herein as those compounds containing the carbon atom skeleton:

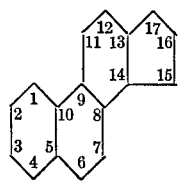

in which each of the carbon-carbon linkages can be either single or double bonded, and which can have carbon and/or other atoms as substituents attached to the carbon atom skeleton.

19-norandrostane series is defined herein as those compounds that differ from androstane series compounds in that the former lack the methyl group at $C_{19}$ attached to $C_{10}$ that characterizes the latter.

Pregnane series is defined herein as those compounds containing the carbon atom skeleton:

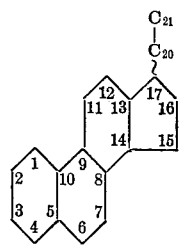

in which the carbon-carbon linkages can be either single or double bonded, and which can have carbon and/or other atoms as substituents attached to the carbon atom skeleton.

19-norpregnane series is defined herein as those compounds that differ from pregnane series compounds in that the former lack the methyl group at $C_{19}$ attached to $C_{10}$ that characterizes the latter.

Spirostane series is defined herein as those compounds containing the carbon atom skeleton:

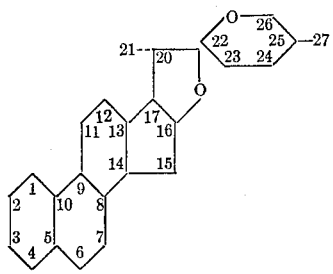

Examples of alkyl of from one through twelve carbon atoms are methyl, ethyl, propyl, butyl, pentyl, hexyl, heptyl, octyl, nonyl, decyl, undecyl and dodecyl and the isomeric forms thereof. Examples of hydroxyalkyl of from one through twelve carbon atoms are hydroxymethyl, hydroxyethyl, hydroxypropyl, hydroxybutyl, hydroxypentyl, hydroxyhexyl, hydroxyheptyl, hydroxyoctyl, hydroxynonyl, hydroxydecyl, hydroxyundecyl and hydroxydodecyl and the isomeric forms thereof. Examples of cycloalkyl are cyclopropyl, cyclobutyl, cyclopentyl, cyclohexyl, cycloheptyl, cyclooctyl, 2-methylyl cyclobutyl, 2,3-diethylcyclobutyl, 4 - propylcyclobutyl, 3-cyclopentylpropyl, etc. Examples of aryl are phenyl, diphenyl, naphthyl, anthryl, etc. Examples of alkaryl are tolyl, xylyl, 2,4,6-triethylphenyl, 3-butylxylyl, 5-hexyltolyl, 2-propyl-3-octylnaphthyl, 2-pentyl-4-decylnaphthyl, 3-decyl-5-anthryl, etc., and the isomeric forms thereof. Examples of tertiary alkyl are t-butyl, t-amyl, etc. Examples of aralkyl are benzyl, phenethyl, α-phenylpropyl, α-naphthylbutyl, β-anthrylpropyl, etc., and the isomeric forms thereof.

Examples of conjugate base are those of any reasonably strong acid, such as:

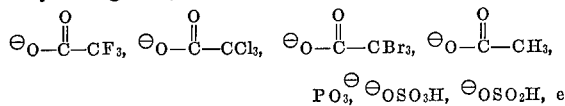

The stronger the acid the weaker the conjugate base, and vice versa.

The 6-(N-disubstituted)aminomethylation process of this invention is generally applicable to the enolic derivatives of 3-keto-$\Delta^4$-steroids. It can be successfully applied to androstane, 19 - norandrostane, 9β,10α - androstane, pregnane, 19-norpregnane, 9β,10α-pregnane, spirostane, cholestane, ergostane and stigmastane series compounds. The foregoing starting compounds can contain the substituents listed below:

Hydroxyl groups and functional derivatives thereof in such positions of the steroid nucleus as 1, 11, 12, 14, 15, 16 (including 16-hydroxymethyl), 17, 18, 20 and 21 (including the condensation products of 16α,17α-glycols with carbonyl components), Carbonyl groups such as at $C_{11}$, $C_{12}$, $C_{15}$, $C_{16}$, $C_{17}$, $C_{18}$ and $C_{20}$, Carbalkoxy groups at $C_{13}$, $C_{16}$ and $C_{17}$, or in the side chain, Alkyl groups other than at $C_4$ and $C_6$, especially at $C_2$, $C_{11}$, $C_{16}$, $C_{17}$ and $C_{21}$, Vinyl, allyl, alkynyl and haloalkynyl groups at $C_{17}$, Methylene and ethylidene groups at $C_{11}$, $C_{16}$, $C_{17}$ and $C_{16}$–$C_{17}$, Lactone, ether and spiroketal residues such as

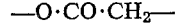

attached to $C_{17}$, etheric groups at $C_{16}$, and bridging $C_{18}$ and $C_{20}$; spiroketal moieties such as are present in diosgenone and spirostane, Chlorine, bromine or fluorine substituents in rings C or D or in the side chain, Unsaturated linkages at $C_{9(11)}$, $C_{11}$, $C_{14}$, $C_{16}$ and $C_{17(20)}$, Ketol groups at $C_{11}$–$C_{12}$, $C_{16}$–$C_{17}$, $C_{17}$–$C_{20}$ and $C_{20}$–$C_{21}$, Epoxides at $C_{16}$–$C_{17}$, Corticoid side chains which can be acylated, diacylated, condensed with carbonyl components such as formaldehyde or acetone (as 2,2-dimethoxypropane) or with ester components such as ethyl orthoformate, ethyl acetoacetate or other functional derivatives thereof as are known to those skilled in the steroid art.

The process of this invention can be used for the 6-(N-disubstituted)aminomethylation of 3 - enol ethers (and acyl derivatives thereof) derived from such 3-keto-4-enes (1) as those that follow:

testosterone,
2-methyltestosterone,
17α-methyltestosterone,
9(11)-dehydro-17α-methyltestosterone,
17α-propynyltestosterone,
17α-acyloxyprogesterone,
9(11)-dehydro-17α-acyloxyprogesterone,
16-methyl-17α-acyloxyprogesterone,
9(11)-dehydro-16-methyl-17α-acyloxyprogesterone,
16-methylene-17α-acyloxyprogesterone,
9(11)-dehydro-16-methylene-17α-acyloxyprogesterone,
17α-acyloxy-16-ethylideneprogesterone,
16α,17α-dimethylmethylenedioxyprogesterone,
9(11)-dehydro-16α,17α-dimethylmethylenedioxyprogesterone,
cortisone,
16-methylcortisone,
21-methylcortisone,
16-methylenecortisone,
16α-hydroxy cortisone and the (16α,17α)-acetonide thereof,
hydrocortisone,
16-methylhydrocortisone,
21-methylhydrocortisone,
16-methylenehydrocortisone,
16α-hydroxyhydrocortisone and the (16α,17α)-acetonide thereof,
17α,21-dihydroxypregna-4,9(11)-diene-3,20-dione,
16-methyl-17α,21-dihydroxypregna-4,9(11)-diene-3,20-dione,
21-methyl-17α,21-dihydroxypregna-4,9(11)-diene-3,20-dione,
16-methylene-17α,21-dihydroxypregna-4,9(11)-diene-3,20-dione,
16α-hydroxy-17α,21-dihydroxypregna-4,9(11)-diene-3,20-dione and the (16,17)-acetonide thereof,
21-fluoro-17α-hydroxypregna-4,9(11)-diene-3,20-dione and the (16,17)-acetonide thereof,
21-fluoro-17α-hydroxypregn-4-ene-3,11,20-trione and the (16,17)-acetonide thereof,
21-fluoro-11,17α-dihydroxypregn-4-ene-3,20-dione and the (16,17)-acetonide thereof,
21-hydroxypregna-4,17-dien-3-one,
11-oxo-21-hydroxypregna-4,17-dien-3-one,
11,21-dihydroxypregna-4,17-dien-3-one,
9(11)-dehydro-21-hydroxypregna-4,17-diene-3-one,
3-oxopregna-4,17-dienoic acid (esters),
3,11-dioxopregna-4,17-dien-21-oic acid (esters),
11-hydroxy-3-oxopregna-4,17-dienoic acid (esters),
9(11)-dehydro-3-oxopregna-4,17-dienoic acid (esters),
21-fluoro-17α-acyloxyprogesterone,
progesterone,
16-methylprogesterone,
11-oxoprogesterone,
9(11)-dehydroprogesterone,
21-methylprogesterone,
17α-hydroxy progesterone,
11α- and 11β-hydroxy progesterone,
3,11-dioxopregna-1,4,17-trien-21-oic acid (esters),
3,17-dioxoandrost-4-ene,
3-oxo-11β,21-dihydroxypregna-4,17(20)-diene,
3-oxo-11β,21-dihydroxypregna-1,4,17(20)-triene,
diosgenone,
17α-cyano-17β-hydroxyandrost-4-en-3-one, 16-methyl-16,17-dehydroprogesterone,
16-cyano-progesterone,
16-carbalkoxyprogesterone,
16-hydroxymethylprogesterone,
3-(3-oxo-17β-hydroxyandrost-4-en-17α-yl)propionic acid,
21-fluoroprogesterone,
testololacetone, and
16-fluoro-corticoids.

The 9α-fluoro derivatives of the above 11β-hydroxy and 11-keto steriods.

It is well known in the steriod art that the introduction of a 6-methyl group into a steriod molecule has often imparted significant biological activity to the thus methylated compound. Consequently, the 6-(N-disubstituted) aminomethyl steroids (III) prepared by the process of this invention can be advantageously employed as precursors of 6-methyl steroids in accordance with the following methods described in Tetrahedron 21, 569:

(1) By alkylating the tertiary amine group with an alkylating agent such as methyl iodide or dimethylsulfate followed by elimination to yield a 6-methylene derivative, which can be hydrogenated with a palladium on carbon catalyst to yield a corresponding 6-methyl steroid.

(2) By preparing the N-oxide from the corresponding tertiary amine (by reaction with hydrogen peroxide), followed by elimination and hydrogenation as in (1), above.

(3) By hydrogenolysis of the amino group with Raney nickel or with palladium on charcoal in cyclohexane to produce the 6-methyl compound directly.

Any of the reagents embraced by Formula II can be prepared in accordance with the method described in J. Amer. Chem. Soc. 90, 5623 for the production of N-disubstituted formaldimmonium acid esters. The reagents (II) can be formed from the corresponding N-oxides of the appropriate tertiary amines by mixing with an organic acid anhydride (e.g., trifluoroacetic anhydride, trichloroacetic anhydride, acetic anhydride, etc.) or an inorganic acid anhydride (e.g., sulfur dioxide, sulfur trioxide, phosphorus pentoxide, etc.). By following the procedure set forth in the aforesaid publication, but substituting for trimethylamine oxide and trifluoroacetic anhydride other N-oxides and other acid anhydrides, such as:

(1) trimethylamine oxide and trichloroacetic anhydride,
(2) trimethylamine oxide and sulfur trioxide,
(3) methyl diphenylamine oxide and tribromoacetic anhydride,
(4) dimethylphenylamine oxide and sulfur dioxide,
(5) methyl di-t-butylamine oxide and trifluoroacetic anhydride, etc.

yields, respectively, (1) N,N-dimethyl formaldimmonium trichloroacetate (II),
(2) N,N-dimethyl formaldimmonium sulfate (II),
(3) N,N-diphenyl formaldimmonium tribromoacetate (II),
(4) N-methyl-N-phenyl formaldimmonium sulfite (II),
(5) N,N-di-t-butyl formaldimmonium trifluoroacetate (II), etc.

A variety of reagents of Formula II are effective for introducing a 6-methyl group into the steroid nucleus. For example, those of the type:

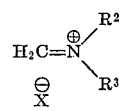

wherein $R^2$ and $R^3$ are independently selected from the group consisting of methyl, tertiary alkyl, aryl and alkaryl and $$\overset{\ominus}{X}$$

is the conjugate base of any reasonably strong acid, e.g.,

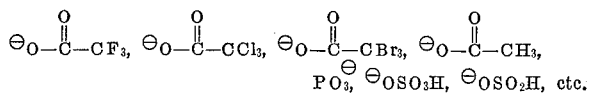

can be conveniently and effectively used. When $R^2$ and $R^3$ are both aryl or $R^2$ is aryl and $R^3$ is methyl, the product (III) is particularly desirable since its treatment with dilute acid yields a 6-methylene steroid directly.

The general method outlined above is capable of introducing functions other than methyl. For example, using the reagent:

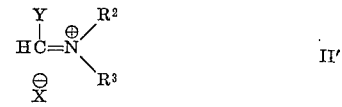

wherein $R^2$ and $R^3$ have the same meaning as above, when Y is carboxyl $CH_2COOH$ is produced at $C_6$, when Y is carboalkoxy $CH_2COO$ alkyl is produced, when $R^3$ is methyl the substituent produced at $C_6$ is ethyl, when Y is phenyl the 6-substituent of the product is benzyl, etc.

There are a number of methods for the preparation of the reagents of Formula II', such as the following:

(1) Metal ion (e.g., $Fe^{+++}$) oxidation of

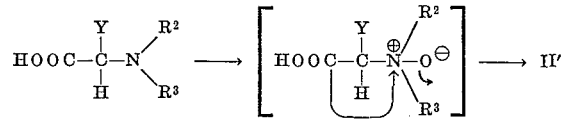

(In accordance with J. Am. Chem. Soc. 79, 2620).

(2) Metal ion (e. g., $Fe^{+++}$) oxidation of

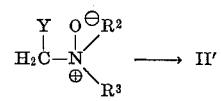

In carrying out the process of the present invention (II+I→III), a compound of Formula II, preferably in a solvent such as chloroform, methylene chloride or ethylene dichloride, or a combination thereof, is slowly added (preferably with mixing) to a compound of Formula I in an appropriate solvent, such as one of the foregoing. The compound of Formula II should be added slowly, between from about one to about two hours being necessary. The molecular ratios of the compounds of Formula II and Formula I can be varied, molar ratios of about 1:1 to about 2:1 are satisfactory, with 1.5:1 usually and preferably being employed. Temperatures between about −30° C. and about +20° C. are suitable for carrying out the reaction between the reagent (II) and the starting steroid (I). The reaction of II+I→III has been found to have gone to completion after the addition of all of the reagent (II) to the starting steroid (I); further standing after the addition does not adversely affect the yield of product (III). After completion of the reaction between II and I, the thus formed 6-(N-disubstituted)aminomethyl product (III) is readily isolated in high yield from the reaction mixture by conventional means; for example, by pouring the reaction mixture into sodium carbonate solution or neutral buffer, extracting it with a solvent (such as methylenechloride), drying the extract and evaporating the solvent to dryness to give the solid product (III). The thus obtained 6-substituted product (III) can be used without further purification in the preparation of 6-methyl steroids, for example, by one of the several known methods described above.

It has been found that in carrying out the process of this invention, the yield of 6-(N-disubstituted)aminomethyl product (III) is greatly enhanced by adding an acid whose anion is the same as the

of a corresponding compound of Formula II to the starting material (I), prior to its mixing with a corresponding compound of Formula II. For example, the addition of 100 mg. of trifluoroacetic acid to 1 g. of 17α-hydroxy-3-methoxy-3,5-pregnadien-20-one 17-acetate (I) in a solvent prior to the addition thereto of 0.9 g. of N,N-dimethyl formaldimmonium trifluoroacetate (II) in a solvent, gives an improved (90% of theoretical) yield of 6-dimethylaminomethyl - 17α - hydroxy - 3 - methoxy - 3,5-pregnadien-20-one 17-acetate (III).

In carrying out the process of this invention (II+I→III)

a reagent of Formula II need not be specifically reacted with a compound of Formula I to yield a corresponding compound of Formula III. Instead, a precursor of II, namely, its corresponding N-oxide (II') can be mixed with (1) a steroidal 3-enol ether starting compound (I), (2) a strong acid (e.g., trifluoroacetic, trichloroacetic, tribromoacetic, acetic, metaphosphoric, sulfurous or sulfuric, etc.) and (3) the anhydride of said strong acid, to yield a corresponding 3-enol ether of a 3-keto-$\Delta^4$-6-(N-disubstituted) aminomethyl steroid (III). Apparently the N-disubstituted formaldimmonium acid ester (II) is formed in situ. Molar ratios of the compounds of Formulae II' and I can be varied, with molar ratios of about 1:1 up to about 2:1 being satisfactory, with 1.5:1 usually and preferably being employed. From about 0.01 to about 0.1 M of strong acid is used with each mole of starting steroid (I) and from about 1 to 2 moles of the acid anhydride is employed per mole of starting material (I). Suitable solvents for the compounds of Formulae II' and I include chloroform, methylene chloride, ethylene dichloride or a combination thereof; methylene chloride is the preferred solvent for both the acid and its anhydride. Other reaction conditions (e.g., temperature, time, etc.) are the same as for the process II+I→III, previously described.

DETAILED DESCRIPTION

It is to be understood that the invention is not to be limited to the exact details of operation or exact compounds shown and described herein, as obvious modifications and equivalents will be apparent to one skilled in the art, and the invention is therefore to be limited only by the scope of the appended claims.

EXAMPLE 1

*6-dimethylaminomethyl-17α-acetoxy-3-methoxy-3,5-pregnadien-20-one (III)*

To 1 g. of the known compound 17α-acetoxy-3-methoxy-3,5-pregnadien-20-one (I) in 25 ml. of chloroform at −5° C., 0.9 g. of N,N-dimethyl formaldimmonium trifluoroacetate (II) (prepared as in J. Am. Chem. Soc. 90, 5623) in 10 ml. of chloroform is added dropwise in the course of about 60 minutes. An additional 5 ml. of chloroform plus 5 ml. of methylene chloride is added to completely dissolve the salt (II). The reaction mixture is maintained between about 0° and −5° C. for about 5 hours and then left for about 15 hours in a freezer. The reaction mixture is then poured into sodium carbonate solution, extracted with methylene chloride, the extract dried and evaporated to give a high yield of 6-dimethylaminomethyl - 17α - acetoxy - 3 - methoxy - 3,5 - pregnadien-20-one (III). Its nuclear magnetic resonance (NMR) spectrum (CD Cl₃) shows: 40(3H), 59(3H), 121(3H), 124(3H), 132(6H), 175(2H), 218(3H), 339(1H) cps.;

$\lambda_{max.}^{methanol}$ 251 mμ (ε=20,000); $\nu_{max.}^{chloroform}$ 1730, 1715 (shoulder), 1648, 1620 cm.$^{-1}$ Following the procedure of Example 1 but adding 100 mg. of trifluoroacetic acid to the chloroform solution of 17α - acetoxy - 3 - methoxy - 3,5 - pregnadien - 20 - one (I), gives an improved (90% of theoretical) yield of 6-dimethylaminomethyl - 17α - hydroxy - 3 - methoxy - 3,5-pregnadien-20-one 17-acetate (III).

Following the procedure above but substituting other compounds of Formula II such as:

(1) N,N-di-t-butyl formaldimmonium tribromoacetate (II),
(2) N-phenyl-N-naphthyl formaldimmonium sulfate (II),
(3) N,N-diphenyl formaldimmonium sulfite (II),
(4) N,N-dinaphthyl formaldimmonium trifluoroacetate (II),
(5) N-methyl-N-phenyl formaldimmonium trifluoroacetate (II),
(6) N-methyl-N-2,4,6-triethylphenyl formaldimmonium tribromoacetate (II),
(7) N-t-amyl-N-xylyl formaldimmonium trichloroacetate (II),
(8) N-nitrophenyl-N-tolyl formaldimmonium sulfate (II),
(9) N-anthryl-N-(2-propyl-4-decyl)naphthyl formaldimmonium sulfite (II),
(10) N-phenyl-N-t-butyl formaldimmonium trifluoroacetate (II), etc., yields respectively, (1) 6-di-t-butylaminomethyl-17α-acetoxy - 3 - methoxy-3,5-pregnadien-20-one (III),
(2) 6-(N-phenyl - N - naphthylaminomethyl)-17α-acetoxy-3,5-pregnadien-20-one (III),
(3) 6-diphenylaminomethyl-17α-acetoxy - 3 - methoxy-3,5-pregnadien-20-one (III),
(4) 6-dinaphthylaminomethyl-17α-acetoxy - 3 - methoxy-3,5-pregnadien-20-one (III),
(5) 6-(N-methyl-N-phenylaminomethyl) - 17α - acetoxy-3-methoxy-3,5-pregnadien-20-one (III),
(6) 6-[N-methyl - N - (2,4,6 - triethylphenyl)aminomethyl]-17α-acetoxy-3-methoxy - 3,5 - pregnadien-20-one (III),
(7) 6-(N-t-amyl-N-xylylaminomethyl) - 17α - acetoxy-3-methoxy-3,5-pregnadien-20-one (III),
(8) 6-(N - nitrophenyl - N - tolylaminomethyl)-17α-acetoxy-3-methoxy-3,5-pregnadien-20-one (III),
(9) 6-[N-anthryl-N-(2-propyl - 4 - decylnaphthyl)aminomethyl]-17α-acetoxy - 3 - methoxy-3,5-pregnadien-20-one (III),
(10) 6-(N-phenyl-N-t-butylaminomethyl) - 17α - acetoxy-3-methoxy-3,5-pregnadien-20-one (III), etc.

EXAMPLE 2

*6-dimethylaminomethyl-17α,20:20,21-bismethylenedioxy-3-ethoxy-3,5-pregnadien-11-one (III)*

Following the procedure of Example 1 and the paragraphs thereafter but substituting 17α,20:20,21-bismethylenedioxy-3-ethoxy-3,5-pregnadien-11-one (I) and N,N-dimethyl formaldimmonium tribromoacetate (II) for the starting materials (I) and formaldimmonium compounds (II) employed therein, yields 6-dimethylaminomethyl-17α,20:20,21-bismethylenedioxy - 3 - ethoxy-3,5-pregnadien-11-one (III).

EXAMPLE 3

*6-dimethylamino-1,3-dimethoxy-11β,17α,21-trihydroxy-3,5-pregnatrien-20-one (III)*

Following the procedure of Example 2 but substituting 1,3-dimethoxy-11β,17α,21-trihydroxy - 3,5 - pregnatrien-20-one (I) and N,N-dimethyl formaldimmonium trifluoroacetate (II), yields 6-dimethylamino-1,3-dimethoxy-11β, 17α,21-trihydroxy-1,3,5-pregnatrien-20-one (III).

EXAMPLE 4

*6-(N-methyl - N - phenylaminomethyl)-3-(β-hydroxyethoxy)-17α-acetoxy-16-methylene - 3,5 - pregnadien-20-one (III)*

Following the procedure of Example 2 but substituting 3-(β-hydroxyethoxy)-17α-acetoxy - 16 - methylene-3,5-pregnadien-20-one (I) and N-methyl-N-phenyl formaldimmonium trichloroacetate (II), yields 6-(N-methyl- N-phenylaminomethyl)-3-(β-hydroxyethoxy) - 17α - acetoxy-16-methylene-3,5-pregnadien-20-one (III).

Following the procedure of Example 4 but adding 100 mg. of acetic acid to the 3-(β-hydroxyethoxy)-17α-acetoxy-16-methylene-3,5-pregnadien-20-one (I), gives an improved yield of 6-(N-methyl - N - phenylaminomethyl)-3-(β-hydroxyethoxy)-17α-acetoxy - 16 - methylene-3,5-pregnadien-20-one (III).

EXAMPLE 5

*6-di-t-butylaminomethyl-3-benzyloxy-16α,17α-isopropylidenedioxy-3,5-pregnadien-20-one (III)*

Following the procedure of Example 2 but substituting 3-benzyloxy-16α,17α-isopropylideneoxy - 3,5 - pregnadien-20-one (I) and N,N-di-t-butyl formaldimmonium sulfite (II), yields 6-di-t-butylaminomethyl-3-benzyloxy-16α,17α-isopropylidenedioxy-3,5-pregnadien-20-one (III).

EXAMPLE 6

*6-[N-methyl - N - (3,4,5-tripropylphenyl)aminomethyl]- 3-(3'-phenylpropyloxy)-17α-methyl - 17β - hydroxy-3, 5-androstadiene 17-propionate (III)*

Following the procedure of Example 2 but substituting 3-(3'-phenylpropyloxy) - 17α - methyl-17β-hydroxy-3,5-androstadiene-17-propionate (I) and N-methyl-N-3,4,5-tripropylphenyl formaldimmonium sulfate (II), yields 6-[N-methyl - N - (3,4,5-tripropylphenyl)aminomethyl]-3-(3'-phenylpropyloxy)-17α-methyl - 17β - hydroxy-3,5-androstadiene 17-propionate (III).

EXAMPLE 7

*6-(N-anthryl-N-phenylaminomethyl)-3-cyclopropyloxy-17β-hydroxy-3,5-androstadiene (III)*

Following the procedure of Example 2 but substituting 3-cyclopropyloxy-17β-hydroxy-3,5-androstadiene (I) and N-anthryl-N-phenyl formaldimmonium metaphosphate (II), yields 6-(N-anthryl-N-phenylaminomethyl)-3-cyclopropyloxy-17β-hydroxy-3,5-androstadiene (III).

EXAMPLE 8

*6-(N-nitrophenyl - N - xylylaminomethyl)-3-(β-hydroxyheptoxy)17α,21-dihydroxy - 3,5 - pregnadiene-11,20-dione 17-acetate (III)*

Following the procedure of Example 2 but substituting 3-(β-hydroxyheptoxy)-17α,21-dihydroxy - 3,5 - pregnadiene-11,20-dione-17-acetate (I) and N-nitrophenyl-N-xylyl formaldimmonium trichloroacetate (II), yields 6-(N-nitrophenyl-N-xylylaminomethyl) - 3 - (β-hydroxyheptoxy) - 17α,21 - dihydroxy - 3,5 - pregnadiene - 11,20-dione 17-acetate (III).

EXAMPLE 9

*6-dimethylaminomethyl-3-butoxy-3,5,17(20)-pregnatrien-21-ethyl-oate (III)*

Following the procedure of Example 2 but substituting 3-butoxy-3,5,17(20)-pregnatrien-21-ethyl-oate (I) and N,N-dimethylformaldimmonium trifluoroacetate (II), yields 6-[N,N-dimethylaminomethyl]-3-butoxy - 3,5,17 (20)-pregnatrien-21-ethyl-oate (III).

Following the procedure of Example 9 but adding 100 mg. of trifluoroacetic acid to the 3-butoxy-3,5,17(20)-pregnatrien-21-ethyl-oate (III).

Following the procedure of Example 9 but adding 100 mg. of trifluoroacetic acid to the 3-butoxy-3,5,17(20)-pregnatrien-21-ethyl-oate (I), gives an improved yield of 6-dimethylaminomethyl - 3 - butoxy-3,5,17(20)-pregnatrien-21-ethyl-oate (III).

EXAMPLE 10

*6-(N-phenyl-N-anthrylaminomethyl)-19-nor-3-ethoxy-17β-hydroxy-3,5-androstadien-17-acetate (III)*

Following the procedure of Example 2 but substituting 19-nor-3-ethoxy - 17β - hydroxy-3,5-androstadien - 17- acetate (I) and N-phenyl-N-anthryl formaldimmonium sulfate (II), yields 6-[N-phenyl-N-anthryl aminomethyl]-19-nor-3-ethoxy-17β-hydroxy-3,5-androstadien - 17 - acetate (III).

EXAMPLE 11

*6-di-t-butylaminomethyl-19-nor-3-cyclopentyloxy-17β-hydroxy-17α-ethynyl-3,5-androstadiene (III)*

Following the procedure of Example 2 but substituting 19-nor-3-cyclopentyloxy - 17β - hydroxy-17α-ethynyl-3,5-androstadiene (I) and N,N-di-t-butyl formaldimmonium acetate (II), yields 6-di-t-butylaminomethyl-19-nor-3-cyclopentyloxy-17β-hydroxy-17α-ethynyl - 3,5 - androstadiene (III).

EXAMPLE 12

*6-(N-nitrophenyl - N - xylylaminomethyl)-3-ethoxy-17β-hydroxy-17α-(1-propynyl)-3,5-androstadiene 17-propionate (III)*

Following the procedure of Example 2 but substituting 3-ethoxy-17β-hydroxy - 17α - (1-propynyl)-3,5-androstadiene 17-propionate (I) and N-nitrophenyl-N-xylyl, formaldimmonium trifluoroacetate (II), yields 6-(N-nitrophenyl-N-xylylaminomethyl) 3 - ethoxy-17β-hydroxy-17α-(1-propynyl)-3,5-androstadiene 17-propionate (III).

EXAMPLE 13

*6-(methyl-N-naphthylaminomethyl)-19-nor-3-hexyloxy-3,5-pregnadien-20-one (III)*

Following the procedure of Example 2 but substituting 19-nor-3-hexyloxy-3,5-pregnadien-20-one (I) and N-methyl-N-naphthyl formaldimmonium sulfite (II), yields 6 - (N-methyl - N-naphthylaminomethyl)-19-nor-3-hexyloxy-3,5-pregnadien-20-one (III).

EXAMPLE 14

*6 - [N-t-amyl-N-(2,4,6-trimethylphenyl)aminomethyl]-3-benzyloxy-17β-hydroxy-17α-ethyl-3,5-androstadiene-17-acetate (III)*

Following the procedure of Example 2 but substituting 3-benzyloxy-17β-hydroxy-17α-ethyl-3,5-androstadiene 17-acetate (I) and N-t-amyl-N-2,4,6-trimethylphenyl formaldimmonium tribromoacetate (II), yields 6-[N-t-amyl-N-2,4,6 - trimethylphenyl) aminomethyl]-3-benzyloxy-17β-hydroxy-17α-ethyl-3,5-androstadiene 17-acetate (III).

EXAMPLE 15

*6-dinaphthylaminomethyl-3-ethoxy-3,5-androstadien-17-one (III)*

Following the procedure of Example 2 but substituting 3-ethoxy-3,5-androstadien-17-one (I) and N,N-dinaphthyl formaldimmonium sulfate (II), yields 6-dinaphthylaminomethyl-3-ethoxy-3,5-androstadien-17-one (III).

EXAMPLE 16

*6-[N-methyl-N-(2,7-dimethylnaphthyl)-aminomethyl] - 3-cyclohexyloxy - 11β,17α,21-trihydroxy-3,5-pregnadien-20-one 21-acetate (III)*

Following the procedure of Example 2 but substituting 3 - cyclohexyloxy - 11β,17α,21-trihydroxy-3,5-pregnadien-20-one 21-acetate (I) and N-methyl-N-2,7-dimethylnapthyl formaldimmonium acetate (II), yields 6-[N-methyl - N-(2,7-dimethylnaphthyl)aminomethyl]-3-cyclohexyloxy - 11β,17α,21 - trihydroxy-3,5-pregnadien-20-one 21--acetate (III).

EXAMPLE 17

*6 - [N - phenyl-N-(1-methyl-7-isopropylnaphthyl)aminomethyl]-3-methoxy-11β,17α-dihydroxy- 21- methyl-3,5-pregnadien-20-one (III)*

Following the procedure of Example 2 but substituting 3 - methoxy-11β,17α-dihydroxy-21-methyl-3,5-pregnadien-20-one (I) and N-phenyl-N-(1-methyl-7-isopropyl)naphthyl formaldimmonium trifluoroacetate (II), yields 6-[N-phenyl - N-(1-methyl-7-isopropylnaphthyl)aminomethyl]-3 - methoxy-11β,17α-dihydroxy-21-methyl-3,5-pregnadien-20-one (III).

EXAMPLE 18

*6-(N-t-butyl-N-tolylaminomethyl)-3-butoxy-16α, 17α-epoxy-3,5-pregnadien-20-one (III)*

Following the procedure of Example 2 but substituting 3-butoxy-16α,17α-epoxy-3,5-pregnadien-20-one (I) and N-t-butyl-N-tolyl formaldimmonium sulfate (II), yields 6-(N-t-butyl-N-tolylaminomethyl) - 3 - butoxy - 16α,17α-epoxy-3,5-pregnadien-20-one (III).

EXAMPLE 19

*6-(N-nitrophenyl-N-xylylaminomethyl) - 3 - ethoxy - 21-fluoro-17α-hydroxy-3,5-pregnadien-20-one 17 - acetate (III)*

Following the procedure of Example 2 but substituting 3-ethoxy-21-fluoro-17α-hydroxy-3,5-pregnadien-20-one 17-acetate (I) and N-nitrophenyl-N-xylyl formaldimmonium trichloroacetate (II), yields 6-(N-nitrophenyl-N-xylylaminomethyl) - 3-ethoxy-21-fluoro-17α-hydroxy-3,5-pregnadien-20-one 17-acetate (III).

EXAMPLE 20

*6-dimethylaminomethyl-3-butoxy-11β,21-dihydroxy-3,5-pregnadien-20-one 21-acetate (III)*

Following the procedure of Example 2 but substituting 3 - butoxy - 11β,21-dihydroxy-3,5-pregnadien-20-one 21-acetate (I) and N,N-dimethyl formaldimmonium trifluoroacetate (II), yields 6-dimethylaminomethyl-3-butoxy-11β, 21-dihydroxy-3,5-pregnadien-20-one 21-acetate (III).

EXAMPLE 21

*6-diphenylaminomethyl-3-ethoxy - 2α - methyl - 11β,17α, 21-trihydroxy-3,5-pregnadien-20-one 21-acetate (III)*

Following the procedure of Example 2 but substituting 2α - methyl-11β,17α,21-trihydroxy-3,5-pregnadien-20-one 21-acetate (I) and N,N-diphenyl formaldimmonium tribromoacetate (II), yields 6-diphenylaminomethyl-3-ethoxy - 2α-methyl-11β,17α,21-trihydroxy-3,5-pregnadien-20-one 21-acetate (III).

EXAMPLE 22

*6-(N-phenyl-N-anthrylaminomethyl)-3-naphthoxy-16α-methyl-3,5-pregnadien-20-one (III)*

Following the procedure of Example 2 but substituting 3 - naphthoxy-16α-methyl-3,5-pregnadien-20-one (I) and N-phenyl - N-anthryl formaldimmonium trichloroacetate (II), yields 6-(N-phenyl-N-anthrylaminomethyl)-3-naphthoxy-16α-methyl-3,5-pregnadien-20-one (III).

Following the procedure of Example 22 but adding 100 mg. of trichloroacetic acid to the 3-naphthoxy-16α-methyl-3,5-pregnadien-20-one (I), gives an improved yield of 6-(N-phenyl-N-anthrylaminomethyl)-3-naphthoxy - 16α-methyl-3,5-pregnadien-20-one (III).

EXAMPLE 23

*6-dimethylaminomethyl-3-anthryloxy-16-methyl-3,5, 16-pregnatrien-20-one (III)*

Following the procedure of Example 2 but substituting 3-anthryloxy-16-methyl-3,5,16-pregnatrien-20-one (I) and N,N-dimethyl formaldimmonium sulfate (II), yields 6-dimethylaminomethyl - 3 - anthryloxy - 16-methyl-3,5,16-pregnatrien-20-one (III).

EXAMPLE 24

*6-(N-methyl - N - phenylaminomethyl) - 3 - phenoxy-9α-fluoro-11β,17α,21-trihydroxy-3,5-pregnadien - 20 - one 21-acetate (III)*

Following the procedure of Example 2 but substituting 3 - phenoxy-9α-fluoro 11β,17α,21-trihydroxy-3,5-pregnadien-20-one 21-acetate (I) and N-methyl-N-phenyl formaldimmonium sulfite (II), yields 6-(N-methyl-N-phenylaminomethyl) - 3 - phenoxy-9α-fluoro-11β,17α,21-trihydroxy-3,5-pregnadien-20-one 21-acetate (III).

Following the procedure of Example 24 but adding 100 mg. of sulfurous acid to the 3-phenoxy-9α-fluoro-11β,17α, 21 - trihydroxy-3,5-pregnadien-20,21-acetate (I), gives an improved yield of 6-(N-methyl-N-phenylaminomethyl)-3-phenoxy-9α-fluoro - 11β,17α,21 - trihydroxy - 3,5 - pregnadien-20-one 21-acetate (III).

EXAMPLE 25

*6-dimethylaminomethyl-1α,3-dimethoxy - 11 - oxo - 3,5, 17(20)-cis-pregnatrien-21-oic acid, methyl ester (III)*

Following the procedure of Example 2 but substituting 1α,3 - dimethoxy-11-oxo-3,5,17(20)-cis-pregnatrien-21-oic acid, methyl ester (I) and N,N-dimethyl formaldimmonium trifluoroacetate (II), yields 6-dimethylaminomethyl-1α,3-dimethoxy-11-oxo-3,5,17(20) - cis - pregnatrien-21-oic acid, methyl ester (III).

EXAMPLE 26

*6-(N-nitrophenyl-N-naphthylaminomethyl) - 3 - butoxy-17α,21-dihydroxy-3,5,9(11)-pregnatrien-20 - one - 21-acetate (III)*

Following the procedure of Example 2 but substituting 3 - butoxy-17α,21-dihydroxy-3,5,9(11)-pregnatrien-20-one 21-acetate (I) and N-nitrophenyl-N-naphthyl formaldimmonium tribromoacetate (II), yields 6-(N-nitrophenyl-N-naphthylaminomethyl)-3-butoxy-17α,21-dihydroxy - 3,5,9 (11)-pregnatrien-20-one 21-acetate (III).

EXAMPLE 27

*6-N,N-diphenylaminomethyl - 3 - methoxy-11β,17α,21-trihydroxy-3,5-pregnadien-20-one 17α,21-acetonide (III)*

Following the procedure of Example 2 but substituting 3-methoxy - 11β,17α,21 - trihydroxy-3,5-pregnadien-20-one 17α,21-acetonide (I) and N,N-diphenyl formaldimmonium trichloroacetate (II), yields 6-N,N-diphenylaminomethyl - 3 - methoxy - 11β,17α,21 - trihydroxy-3,5-pregnadien-20-one 17α,21-acetonide (III).

EXAMPLE 28

*6-dimethylaminomethyl-3-ethoxy-25D-spirosta-3,5-diene (III)*

Following the procedure of Example 2 but substituting 3-ethoxy-25D-spirosta-3,5-diene (I) and N,N-dimethyl formaldimmonium trifluoroacetate (II), yields 6-dimethylaminomethyl-3-ethoxy-25D-spirosta-3,5-diene (III).

EXAMPLE 29

*6-[N-phenyl - N - 2 - ethylnaphthyl)aminomethyl]-3-phenoxy-17α,21 - methoxymethylenedioxy-3,5-pregnadiene-11,20-dione (III)*

Following the procedure of Example 2 but substituting 3-phenoxy - 17α,21 - methoxymethylenedioxy-3,5-pregnadiene-11,20-dione (I) and N-phenyl-N-2-ethylnaphthyl formaldimmonium tribromoacetate (II), yields 6-[N-phenyl - N-2-ethylnaphthyl)aminomethyl] - 3 - phenoxy-17α,21-methoxymethylenedioxy - 3,5 - pregnadiene-11,20-dione (III).

EXAMPLE 30

*6-[N-2-ethylphenyl - N - 3 - butylphenyl)aminomethyl]-3-cyclopentyloxy-17β-hydroxy - 17α - vinyl-3,5-androstadiene 17-propionate (III)*

Following the procedure of Example 2 but substituting 3-cyclopentyloxy - 17β - hydroxy-17α-vinyl-3,5-androstadiene 17-propionate (I) and N-2-ethylphenyl-N-3-butylphenyl formaldimmonium trichloroacetate (II), yields 6 - (N - 2 - ethylphenyl-N-3-butylphenylaminomethyl)-3-cyclopentyloxy-17β-hydroxy-17α-vinyl - 3,5 - androstadiene 17-propionate (III).

EXAMPLE 31

*6-(N-phenyl-N-nitrophenylaminomethyl)-3-ethoxy-20β-hydroxy-3,5-pregnadiene 20-acetate (III)*

Following the procedure of Example 2 but substituting 3-ethoxy-20β-hydroxy-3,5-pregnadiene 20-acetate (I) and N-phenyl - N - nitrophenyl formaldimmonium trichloroacetate (II), yields 6-(N-phenyl-N-nitrophenylaminomethyl)-3-ethoxy-20β-hydroxy-3,5-pregnadiene 20-acetate (III).

EXAMPLE 32

*6-(N-methyl-N-phenylaminomethyl) - 3 - (3 - propylphenoxy)-3,5-pregnadiene - 18 - oic acid (18→20) lactone (III)*

Following the procedure of Example 2 but substituting 3-(3-propylphenoxy)3,5-pregnadien-18-oic acid (18→20) lactone (I) and N-methyl-N-phenyl formaldimmonium sulfate (II), yields 6-(N-methyl-N-phenylaminomethyl)-3-(3-propylphenoxy)-3,5-pregnadien-18-oic acid (18→20) lactone (III).

EXAMPLE 33

*6-(N-anthryl-N-naphthylaminomethyl)-3-butoxy-16α-cyano-3,5-pregnadien-20-one (III)*

Following the procedure of Example 2 but substituting 3-butoxy - 16α - cyano - 3,5 - pregnadien-20-one (I) and N-anthryl-N-naphthyl formaldimmonium sulfite (II), yields 6 - (N-anthryl-N-naphthylaminomethyl)-3-butoxy-16α-cyano-3,5-pregnadien-20-one (III).

EXAMPLE 34

*6-diphenylaminomethyl-3-methoxy-16α,17α-cyclomethylene-3,5-pregnadien-20-one (III)*

Following the procedure of Example 2 but substituting 3-methoxy-16α,17α-cyclomethylene - 3,5 - pregnadien-20-one (I) and N,N-diphenyl formaldimmonium trifluoroacetate (II), yields 6-diphenylaminomethyl-3-methoxy-16α,17α-cyclomethylene-3,5-pregnadien-20-one (III).

EXAMPLE 35

*6-(N-naphthyl-N-nitrophenylaminomethyl)-3-butoxy-17-oxa-D-homo-3,5-androstadien-17-one (III)*

Following the procedure of Example 2 but substituting 3-butoxy-17-oxa-D-homo-3,5-androstadien-17-one (I) and N-naphthyl-N-nitrophenyl formaldimmonium tribromoacetate (II), yields 6-(N-naphthyl-N-nitrophenylamino)-3-butoxy-17-oxa-D-homo-3,5-androstadien-17-one (III).

EXAMPLE 36

*6-ditolylaminomethyl-3-tolyloxy-15α-hydroxy-3,5-pregnadien-20-one 15-acetate (III)*

Following the procedure of Example 2 but substituting 3-tolyloxy - 15α - hydroxy-3,5-pregnadien-20-one 15-acetate (I) and N,N-ditolyl formaldimmonium trichloroacetate (II), yields 6-ditolylaminomethyl-3-tolyloxy-15α-hydroxy-3,5-pregnadien-20-one 15-acetate (III).

EXAMPLE 37

*6-(N-anthryl-N-xylylaminomethyl) - 3-(β-ethoxyethoxy)-17β-hydroxy-3,5-androstadiene 17-acetate (III)*

Following the procedure of Example 2 but substituting 3-(β-ethoxyethoxy) - 17β - hydroxy - 3,5 - androstadiene 17-acetate (I) and N-anthryl-N-xylyl formaldimmonium tribromoacetate (II), yields 6-(N-anthryl-N-xylylaminomethyl)-3-(β-ethoxyethoxy) - 17β - hydroxy-3,5-androstadiene 17-acetate (III).

EXAMPLE 38

*6-(N-t-butyl-N-naphthylaminomethyl)-3-propoxy-9β,10α-pregna-3,5-dien-20-one (III)*

Following the procedure of Example 2 but substituting 3-propoxy - 9β,10α - pregna-3,5-dien-20-one (I) and N-t-butyl-N-naphthyl formaldimmonium sulfate (II), yields 6-(N-t-butyl-N-naphthylaminomethyl) - 3 - propoxy-9β,10α-pregna-3,5-diene-20-one (III).

EXAMPLE 39

*6-dimethaminomethyl-3-methoxy-17α,21-dihydroxy-3,5-pregnadiene-11,20-dione 17,21-diacetate (III)*

Following the procedure of Example 2 but substituting 3-methoxy-17α,21-dihydroxy - 3,5 - pregnadiene - 11,20-dione 17,21-diacetate (I) and N,N-dimethyl formaldimmonium trifluoroacetate (II), yields 6-dimethylaminomethyl-3-methoxy - 17α,21 - dihydroxy-3,5-pregnadiene-11,20-dione 17,21-diacetate (III).

EXAMPLE 40

*6-dimethylaminomethyl-17α-hydroxy-3-methoxy-3,5-pregnadien-20-one 17-acetate (III)*

To a solution of 10 g. of trimethylamine oxide (II'), 40 g. of 17α-hydroxy-3-methoxy-3,5-pregnadien-20-17-acetate (I) and 5 g. of trifluoroacetic acid in 500 ml. of methylene chloride is slowly added 50 g. of trifluoroacetic anhydride in 1 l. of methylene chloride maintaining the temperature at 0° C. The reaction mixture is maintained between about 0° and —5° C. for about 5 hours after which 80 ml. of triethylamine was added. It is then poured into 1 N sodium carbonate solution, extracted with methylene chloride, the extract dried and evaporated to give a high yield of 6-dimethylaminomethyl-17α-hydroxy-3-methoxy-3,5-pregnadien-20-one 17-acetate (III).

Following the procedure of Example 40 but substituting stoichiometric equivalent amounts of other compounds of Formula II', other starting materials of Formula I, other strong acids for trifluoroacetic acid and other corresponding anhydrides for trifluoroacetic anhydride, such as (1) phenyldimethylamine oxide (II'), 3-benzyloxy-16α, 17α-isopropylideneoxy-3,5-pregnadien-20-one (I), tribromoacetic acid and tribromoacetic anhydride, (2) diphenylmethylamine oxide (II'), 3-(3'-phenylpropyloxy)-17α-methyl-17β-hydroxy-3,5-androstadiene 17-propionate (I), trichloroacetic acid and trichloroanhydride.

(3) dimethyl-t-butylamine oxide (II'), 3-(β-hydroxyheptoxy-17α,21-dihydroxy-3,5-pregnadiene-11,20-dione 17-acetate (I), acetic acid and acetic anhydride, (4) phenyl-t-butylmethylamine oxide (II'), 19-nor-3-ethoxy-17β-hydroxy-3,5-androstadiene 17-acetate (I), metaphosphoric acid and metaphosphoric anhydride, (5) xylyl-t-amylmethylamine oxide (II'), 19-nor-3-cyclopentyloxy-17β-hydroxy-17α-ethynyl-3,5-androstadiene (I), sulfuric acid and sulfur trioxide, (6) dimethylxylylamine oxide (II'), 3-cyclohexyloxy-11β,17α,21-trihydroxy-3,5-pregnadien-20-one 21-acetate (I), sulfurous acid and sulfur dioxide, (7) naphthyl-t-butylmethylamine (II'), 3-butoxy-11β,21-dihydroxy-3,5-pregnadien-20-one 21-acetate (I), trifluoroacetic acid and trifluoroacetic anhydride, (8) dinaphthylmethylamine oxide (II'), 3-naphthoxy-16α-methyl-3,5-pregnadien-20-one (I), tribromoacetic acid and tribromoacetic anhydride, (9) nitronaphthyl-t-amylmethylamine oxide (II'), 3-phenoxy-9α-fluoro-11β,17α,21-trihydroxy-3,5-pregnadien-dien-20-one 21-acetate (I), trichloroacetic acid and trichloracetic anhydride,

(10) anthryl-t-amylmethylamine oxide (II'), 3-ethoxy-25D-spirosta-3,5-diene (I), acetic acid and acetic anhydride,

(11) [methyl-(2-ethyl-4-propylnaphthyl)-tolyl]amine oxide (II'), 3-amyloxy-17β-hydroxy-17α-vinyl-3,5-androstadiene 17-propionate (I), metaphosphoric acid and metaphosphoric anhydride,

(12) nitrophenylxylylmethylamine oxide (II'), 3 - (3-butylphenoxy)-3,5-pregnadien-18-oic acid (18→20) lactone (I), sulfuric acid and sulfur trioxide,
(13) chlorophenyl-t-amylmethylamine oxide (II'), 3-butoxy-17-oxa-D-homo-3,5-androstadien-17-one (I), sulfurous acid and sulfur dioxide.
(14) anthrylxylylmethylamine oxide (II'), 3-(β-ethoxyethoxy)-17β-hydroxy-3,5-androstadiene 17-acetate (I), trifluoroacetic acid and trifluoroacetic anhydride,
(15) phenylnaphthylmethylamine oxide (II'), 3-propoxy-9β,10α-pregna-3,5-dien-20-one (I), tribromoacetic acid and tribromoacetic anhydride, etc., yields, respectively, (1) 6 - (N - phenyl-N-methylaminomethyl)-3-benzyloxy-16α,17α-isopropylidenedioxy-3,5-pregnadien-20-one (III),
(2) 6 - diphenylaminomethyl - 3 - (3' - phenylpropyloxy)-17α-methyl-17β-hydroxy-3,5-androstadiene 17-propionate (III),
(3) 6 - (N-methyl-N-t-butylaminomethyl)-3-(β-hydroxy heptoxy) - 17α,21-dihydroxy-3,5-pregnadiene-11,20-dione 17-acetate (III),
(4) 6 - (N - phenyl-N-t-butylaminomethyl)-19-nor-3-ethoxy-17β-hydroxy-3,5-androstadiene 17-acetate (III),
(5) 6 - (N - xylyl-N-t-amylaminomethyl)-19-nor-3-cyclopentyloxy-17β-hydroxy-17α-ethynyl-3,5-androstadiene (III),
(6) 6 - (N - xylyl - N-methylaminomethyl)-3-cyclohexyloxy-11β,17α,21-trihydroxy-3,5-pregnadiene-20-one 21-acetate (III),
(7) 6-(N-naphthyl-N-t-butylaminomethyl)-3-butoxy-11β,21-dihydroxy-3,5-pregnadiene-20-one 21-acetate (III),
(8) 6-dinaphthylaminomethyl-3-naphthoxy-16α-methyl-3,5-pregnadien-20-one (III),
(9) 6-(N-nitronaphthyl-N-t-amylaminomethyl)-3-phenoxy-9α-fluoro-11β,17α,21-trihydroxy-3,5-pregnadien-20-one 21-acetate (III),
(10) 6-(N-anthryl-N-t-amylaminomethyl-3-ethoxy-25D-spirosta-3,5-diene (III),
(11) 6-[N-(2-ethyl-4-propylnaphthyl)-N-xylylaminomethyl]-3-amyloxy-17β-hydroxy-17α-vinyl-3,5-androstadiene 17-propionate (III),
(12) 6-(N-nitrophenyl-N-xylylaminomethyl)-3-(3-butylphenoxy)-3,5-pregnadien-18-oic acid (18→20) lactone (III),
(13) 6-(N-chlorophenyl-N-t-amylaminomethyl)-3-butoxy-17-oxa-D-homo-3,5-androstadien-17-one (III),
(14) 6-(N-anthryl-N-xylylaminomethyl)-3-(β-ethoxyethoxy)-17β-hydroxy-3,5-androstadiene-17-acetate (III),
(15) 6 - (N-phenyl-N-naphthylaminomethyl)-3-propoxy-9β,10α-pregna-3,5-diene-20-one (III), etc.

I claim:
1. A process for the production of a steroid compound having in rings A and B of the steroid nucleus the structure

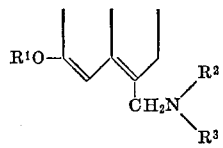

wherein R¹ is selected from the group consisting of alkyl of from one through twelve carbon atoms, hydroxyalkyl of from one through twelve carbon atoms, cycloalkyl of from three through eight carbon atoms, aryl of from six through fourteen carbon atoms, alkaryl wherein the aryl moiety is from six through fourteen carbon atoms and the alkyl group(s) substituted therein contain(s) from one through twelve carbon atoms, aralkyl wherein the alkyl moiety is from one through twelve carbon atoms and the aryl group(s) substituted therein contain(s) from six through fourteen carbon atoms, and R² and R³ are independently selected from the group consisting of methyl, tertiary alkyl, aryl and alkaryl which are as defined above, which comprises mixing a corresponding compound of the formula

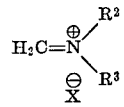

wherein R² and R³ have the same meaning as above and

is the conjugate base of a strong acid, with a corresponding steroid compound having in rings A and B of the steroid nucleus the structure

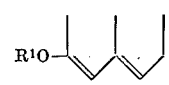

wherein R¹ has the same meaning as above.

2. A process in accordance with claim 1 wherein the compound of Formula III is 6-dimethylaminomethyl-17α-hydroxy-3-methoxy-3,5-pregnadien-20-one 17-acetate, the compound of Formula II is N,N-dimethyl formaldimmonium trifluoroacetate and the compound of Formula I is 17α - hydroxy - 3 - methoxy - 3,5-pregnadien-20-one 17-acetate.

3. A process in accordance with claim 1 wherein the compound of Formula III is 6-dimethylaminomethyl-1α,3-dimethoxy-11-oxo-3,5,17(20)-cis-pregnatrien-21-oic acid, methyl ester, the compound of Formula II is N,N-dimethyl formaldimmonium trifluoroacetate and the compound of Formula I is 1α,3-dimethoxy-11-oxo-3,5,17(20)-cis-pregnatrien-21-oic acid, methyl ester.

4. A process for the preparation of a compound of Formula III in accordance with claim 1, wherein an acid whose anion is the same as the

of a corresponding compound of Formula II is added to a corresponding compound of Formula I, prior to its mixing with a corresponding compound of Formula II.

5. A process in accordance with claim 4 wherein the compound of Formula III is 6-dimethylaminomethyl-17α-hydroxy-3-methoxy-3,5-pregnadien-20-one 17-acetate, the compound of Formula II is N,N-dimethyl formaldimmonium trifluoroacetate, the compound of Formula I is 17α-hydroxy-3-methoxy-3,5-pregnadien-20-17-acetate, and the acid added to the compound of Formula I is trifluoroacetic acid.

6. A process for the production of a steroid compound having in rings A and B of the steroid nucleus the structure

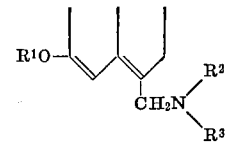

wherein R¹ is selected from the group consisting of alkyl of from one through twelve carbon atoms, hydroxyalkyl of from one through twelve carbon atoms, cycloalkyl of from three through eight carbon atoms, aryl of from six through fourteen carbon atoms, alkaryl wherein the aryl moiety is from six through fourteen carbon atoms and the alkyl group(s) substituted therein contain(s) from one through twelve carbon atoms, aralkyl wherein the alkyl moiety is from one through twelve carbon atoms and the aryl group(s) substituted therein contain(s) from six through fourteen carbon atoms, and R² and R³ are independently selected from the group consisting of methyl, tertiary alkyl, aryl and alkaryl which are as defined above, which comprises mixing a corresponding compound of the formula

   II' wherein $R^2$ and $R^3$ have the same meaning as above, with a corresponding steroid compound having in rings A and B of the steroid nucleus the structure

   I wherein $R^1$ has the same meaning as above, a strong acid and the anhydride of said strong acid.

7. A process in accordance with claim 6 wherein the compound of Formula III is 6-dimethylaminomethyl-17α-hydroxy-3-methoxy-3,5-pregnadien-20-one 17-acetate, the compound of Formula II' is trimethylamine oxide, the compound of Formula I is 17α-hydroxy-3-methoxy-3,5-pregnadien-20-one 17-acetate, the strong acid is trifluoroacetic acid and the anhydride is trifluoroacetic anhydride.

No reference cited.

HENRY A. FRENCH, Primary Examiner

U.S. Cl. X.R.

260—239.55, 239.57, 397.2, 397.4, 397.45, 397.47, 397.5, 999